US008031723B2

(12) United States Patent
Lespagnol

(10) Patent No.: US 8,031,723 B2
(45) Date of Patent: Oct. 4, 2011

(54) CENTRALIZED SWITCHING AND ROUTING PACKET HANDLING DEVICE

(75) Inventor: Albert Lespagnol, St Cyr l'Ecole (FR)

(73) Assignee: Alcatel Lucent, Paris (FR)

( * ) Notice: Subject to any disclaimer, the term of this patent is extended or adjusted under 35 U.S.C. 154(b) by 1210 days.

(21) Appl. No.: 10/418,094

(22) Filed: Apr. 18, 2003

(65) Prior Publication Data

US 2004/0090957 A1    May 13, 2004

(30) Foreign Application Priority Data

Apr. 19, 2002  (FR) ..................................... 02 04930

(51) Int. Cl.
H04L 12/00 (2006.01)
(52) U.S. Cl. ..................... 370/395.71; 370/392; 370/389
(58) Field of Classification Search .................. 370/389, 370/392, 395.52, 395.53, 395.71, 401, 409, 370/413, 422, 351, 395.1, 395.3, 395.31, 370/395.4, 395.42, 395.43, 395.5, 395.54, 370/395.7, 395.72, 400, 412, 428, 429, 471; 709/238, 250
See application file for complete search history.

(56) References Cited

U.S. PATENT DOCUMENTS

| 5,237,564 | A | * | 8/1993 | Lespagnol et al. ............ 370/398 |
| 5,898,687 | A | * | 4/1999 | Harriman et al. ............. 370/390 |
| 6,081,522 | A | * | 6/2000 | Hendel et al. ................ 370/389 |
| 6,088,356 | A | | 7/2000 | Hendel et al. |
| 6,147,999 | A | * | 11/2000 | Honda et al. .................. 370/396 |
| 6,909,720 | B1 | * | 6/2005 | Willis ......................... 370/395.52 |
| 6,963,572 | B1 | * | 11/2005 | Carr et al. ..................... 370/401 |
| 6,980,543 | B1 | * | 12/2005 | Kastenholz et al. .......... 370/352 |
| 7,079,537 | B1 | * | 7/2006 | Kanuri et al. ................. 370/392 |
| 7,154,890 | B2 | * | 12/2006 | Nagatomo et al. ............ 370/392 |
| 7,184,440 | B1 | * | 2/2007 | Sterne et al. ............. 370/395.52 |
| 2001/0038636 | A1 | | 11/2001 | Nanduri et al. |
| 2003/0053414 | A1 | * | 3/2003 | Akahane et al. .............. 370/216 |

OTHER PUBLICATIONS

IEEE 100, The Authoritative Dictionary of IEEE Standards Terms, 7th edition, Standard Information Network IEEE Press, p. 904.*
U.S. Appl. No. 10/418,093, entitled "A Parallel Processing Routing Device" filed Apr. 18, 2003, Inventor: Albert Lespangnal.

* cited by examiner

Primary Examiner — Ricky Ngo
Assistant Examiner — Peter L Cheng
(74) Attorney, Agent, or Firm — Sughrue Mion, PLLC

(57) ABSTRACT

A device comprising i) input ports and output ports for receiving and transmitting data packets, ii) a receiver to extract primary switching or routing data and secondary data to be handled and to associate the secondary data with a selected storage address, iii) a memory for storing the secondary data extracted at the storage address, iv) a switching stage and a routing stage configured to receive the storage address and the primary switching or routing data and to determine tertiary data designating at least one of the output ports and to determine new primary data, v) extracting the tertiary data and the new primary data from the switching stage and the routing stage to deliver the data and the storage address as a function of a selected criterion, and vi) sending the secondary data stored at the storage address, combined with the new primary data to each output port designated by the tertiary data.

21 Claims, 4 Drawing Sheets

CENTRALIZED SWITCHING AND ROUTING PACKET HANDLING DEVICE

The invention relates to the field of handling data packets within a network and more particularly to devices providing switching and routing functions.

In the present context, "switching" refers to the selection of a connection between two points of a network to transmit data packets (at level 2 of the OSI model).

The term "routing" refers to the function of transferring data packets within a network at level 3 of the OSI model.

Switching and routing are essential functions to transmission of data in networks. They are implemented by level 2 forwarding (L2F) switches or level 3 forwarding (L3F) routers.

There are also "composite" data packet handling devices (known as "switch-routers") that provide both the switching function and the routing function. However, because of their complexity and the required technical specifications, these devices have a distributed architecture, especially if very high bit rates of the OC192c type or higher are required. For example, in edge switch-routers (ESR), the switching and routing functions are performed by two separate dedicated circuits. A particular result of this is that the common functions provided by the two circuits, such as buffering and traffic management, cannot be shared, and the functions provided by each of the circuits must have the capacity needed to handle the maximum bit rate, even if the average bit rate is very much lower than the maximum bit rate. For example, a transmission line card at the output of an OC192c interface (9.6 Gbit/s) must be rated to support 25 million packets per second, each packet comprising 50 bytes.

Moreover, because the network is constantly evolving, routing necessitates frequent refreshing of several megabits, typically every five seconds. Consequently, if the routing function is distributed, refreshing significantly limits the performance of the handling device.

Thus one object of the invention is to remedy some or all of the above-mentioned drawbacks by proposing a handling device in which the switching and routing functions are centralized (i.e. integrated).

To be more precise, to this end the invention proposes a data packet handling device comprising:

input ports and output ports for respectively receiving and transmitting data packets, receiver means configured to extract primary switching or routing data (such as destination ports and addresses) and secondary data to be switched or routed from data packets received by the input ports and to associate the secondary data with a selected storage address, a memory for storing the secondary data extracted by the receiver means at the storage address, a switching stage configured to receive from the receiver means the primary switching data and the storage address and to determine tertiary data designating at least one of the output ports and to determine new primary switching data (for example in the form of a label identifying a connection between points of the network) from the primary switching data and stored data, a routing stage configured to receive from the receiver means the primary routing data and the storage address and to determine tertiary data designating at least one of the output ports and to determine new primary routing data (for example in the form of a label identifying a from the primary routing data and stored data, monitoring means configured to extract the tertiary data and the new primary data from the switching stage and the routing stage and to deliver the tertiary and new primary data and the storage address, to a sending means, as a function of a selected criterion (such as, for example, "the packet arriving first" or "the packet associated with the highest quality of service"), and sending means adapted to extract from the memory the secondary data stored at the storage address and to send the extracted secondary data combined with the new primary data to each output port designated by the tertiary data.

Because traffic monitoring and buffering are shared, the device can implement the switching and routing functions, generally referred to as the L2F and L3F functions, in a centralized manner (and integrated on the same card).

According to another feature of the invention, firstly, the receiver means are adapted to divide each data packet received into segments of equal length, so that the secondary data is stored in segmented form, and, secondly, the sending means are adapted to reconstitute the segmented extracted secondary data in order to combine it with the new primary data. This has the advantage that packets of varying length can be processed independently of the protocols used.

The switching stage preferably includes an L2F switching stage which includes, firstly, a management module including a management buffer memory adapted to store at a selected address at least the primary switching data and the storage address communicated by the receiver means and, secondly, a transfer module coupled to the management module and including a rewritable memory containing the switching table and an input buffer memory adapted to store the selected management address as a function of a selected criterion and to communicate the selected address to the management module on command. The management module is then adapted, on receiving the selected address, to communicate to the transfer module at least some of the stored primary data and the storage address so that it can determine the new primary switching data and tertiary data in the switching table on the basis of the received primary data and deliver the tertiary and new primary data on the instructions of the monitoring means.

The routing stage preferably includes an L3F routing stage which includes, firstly, a management module including a management buffer memory adapted to store at a selected address at least the primary routing data and the storage address communicated by the receiver means and, secondly, a transfer module coupled to the management module and including a rewritable memory containing the routing table and an input buffer memory adapted to store the selected management address as a function of a selected criterion and to communicate the selected address to the management module on command. The management module is then adapted, on receiving the selected address, to communicate at least some of the stored primary data and the storage address to the transfer module so that it can determine the new primary routing data and tertiary data in the routing table from the received primary data and deliver the data on the instructions of the monitoring means.

The transfer module of the routing stage can also have the same number of output buffer memories as there are output ports, which output buffer memories are adapted to receive the tertiary data and the new primary data from the rewritable memory and the storage address from the management module. A group of output buffer memories can instead be provided for each output port, for example to offer a plurality of different qualities of service.

The monitoring means can preferably include at least the same number of buffer memories as there are output ports and the buffer memories are adapted to receive the storage address and the primary and tertiary data coming from the switching stage and the routing stage. A buffer memory group can instead be provided for each output port, for example to offer a plurality of different qualities of service.

Furthermore, the monitoring means can include the same number of intermediate (collection) modules as there are buffer output memories for temporarily storing the storage address and the primary and tertiary data respectively delivered by the switching stage and the routing stage in first and second areas. They can therefore deliver to the buffer memories of the monitoring means, on command and as a function of the criterion selected, either the storage address and the primary and tertiary switching data or the storage address and the primary and tertiary routing data.

In a preferred embodiment, the input and output buffer memories are first in first out (FIFO) memories.

The invention also proposes a method of handling data packets, consisting in:

receiving data packets at input ports, extracting primary switching or routing data and secondary data to be handled from the received data packets and associating the secondary data with a selected storage address, storing the secondary data extracted at the storage address, determining tertiary data designating at least one of the output ports and determining new primary switching or routing data from the received primary data and data stored in a switching table or in a routing table, according to whether the received data is primary switching or routing data, Delivering, to a sending means, the tertiary data, the new primary switching or routing data, and the storage address as a function of a selected criterion, and extracting the secondary data stored at the storage address and sending the extracted secondary data combined with the new primary data to each output port designated by the tertiary data delivered.

The above types of switching and routing are generally referred to as L2F switching and L3F routing, respectively.

When data packets are received they are advantageously divided into segments of equal length so that the secondary data is stored in segmented form. In this case, the data is reconstituted in order to combine it with the new primary data before sending the handled secondary data.

It is preferable to first store the tertiary data and the new primary switching or routing data, and then apply selected criterion before delivering the tertiary data and the new primary switching or routing data to a sending means. In this way, either routing data or switching data can be selected to send the secondary data.

The installation and the method of the invention are particularly, although not exclusively, suitable for switching standards such as ATM, frame-based ATM, frame relay and MPLS, and for routing standards such as IP, regardless of the media, and those corresponding to connectionless protocols.

BRIEF DESCRIPTION OF THE DRAWINGS

Other features and advantages of the invention become apparent on examining the following detailed description and the appended drawings, in which.

Figure 1:
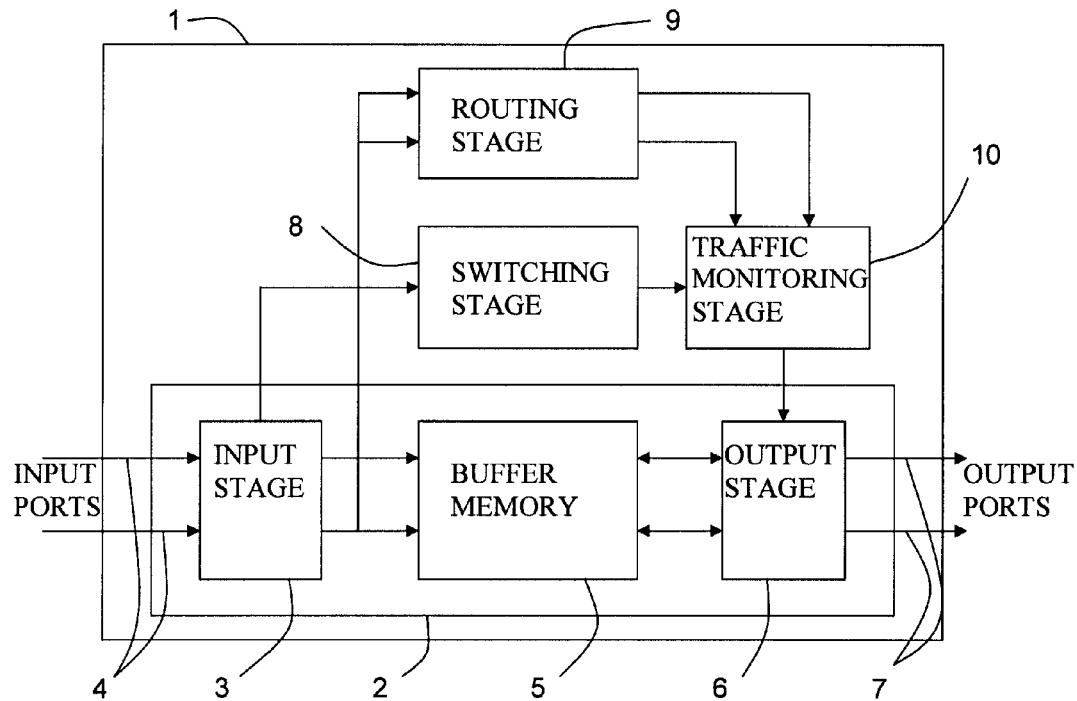
FIG. 1 is a block diagram showing a handling device of the invention.

The drawing is for the most part of a specific nature and consequently constitutes part of the description of the invention as well as contributing to the definition of the invention.

Refer first to FIG. 1 for a description of one embodiment of a packet handling device of the invention with centralized switching and routing.

The device 1 firstly comprises a data transport stage 2 comprising an input sub-stage (also known as an "ingress stage") 3 with input ports 4 for receiving data packets, a buffer memory 5 for temporarily storing data to be handled communicated by the input sub-stage 3, and an output sub-stage (also known as an "egress stage") 6 with output ports 7 for delivering handled data, in particular from the buffer memory 5.

The device 1 further includes a switching stage 8 fed with switching data by the input sub-stage 3, a routing stage 9 fed with routing data by the input sub-stage 3, and a traffic monitoring stage 10 fed by the switching stage 8 and the routing stage 9 and feeding the output sub-stage 6 with new switching or routing data.

Figure 9A:
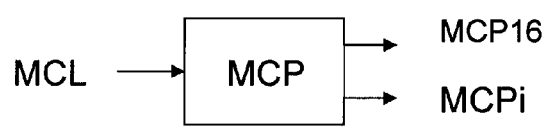
FIGS. 9A and 9B are diagrams showing signals generated by a main clock of the device and the connection between the main clock and the counters of the device.
Figure 9B:
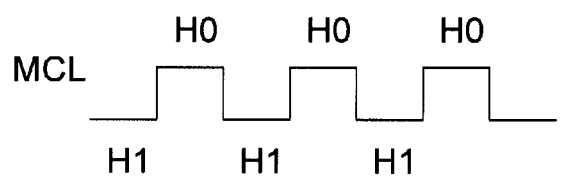

The components of the device 1 are synchronized by a main clock MCL whose period serves as the basis for incrementing a main counter MCP and auxiliary counters (MCP16, MCPi), as shown in FIGS. 9A and 9B. MCPx is a modulo x counter incremented at the timing rate of the clock MCL.

The data transport stage 2, the switching stage 8 and much of the traffic monitoring stage 10 are described in detail in the documents U.S. Pat. No. 5,237,564 and EP 00/440 281, the technical contents of which are hereby incorporated by way of reference herein in full. Consequently, only the main functions of these stages are described here, and not their auxiliary functions.

The input sub-stage 3 is firstly adapted to receive data packets of varying length at its n input ports 4 and to extract from that data primary data representative of switching or routing information that must be processed by the switching stage 8 or the routing stage 9 and secondary data that is to be switched or routed.

The secondary data is sent to the buffer memory 5 and stored therein at a storage address FSA(n). For example, if the buffer memory 5 can store n segments, then a counter MCPn indicates at all times the storage address FSA(n) for the incoming segment in the buffer memory 5. The primary data is communicated to the switching stage 8 or to the routing stage 9, according to whether they contain switching information or routing information. In other words, if a packet contains secondary data to be switched, the associated primary data is sent to the switching stage 8, whereas if a packet contains secondary data to be routed, then the associated primary data is sent to the routing stage 9.

The primary data is sent to the switching stage 8 or the routing stage 9 together with the storage address FSA(n), which is in fact the current value of MCPn, at which the associated secondary data is temporarily stored.

As described in the above-mentioned patent documents, the received data packets are preferably first segmented in the input sub-stage 3 before their data is sent to the buffer memory 5 and to the stages 8 and 9. Segmentation consists of dividing each packet into segments of equal length, preserving the link that unites them at the level of the buffer memory 5 and the switching stage 8 and the routing stage 9. Once the new routing information has been determined by the switching stage 8 or the routing stage 9, the secondary data of the original packet awaiting transmission in the buffer memory 5 is reconstituted by adding the new handling information (primary data) to it before it is communicated to the output ports 7.

The switching stage 8 or the routing stage 9 counts the number (PL(i)) of segments of a received packet as and when segments arrive.

The primary data is usually contained in the first segment of the received packet. It generally includes the packet source port and address and the packet destination port and address.

In the case of routing, the primary data is generally routing information, for example the destination address, used to index the routing table. The routing information is generally a global identifier, meaning that no connection has to be set up before the packet is sent. Many routing protocols function in accordance with this principle, in particular the Internet Protocol (IP), regardless of the media. In the case of the IP, the global identifier, referred to as the IP address, is used to route the packet locally and the next primary data delivered by the routing table constitutes a new label used for routing in the next device.

If the device 1 has n input ports 4, each segment is divided into n words. The time to process a word is equal to the period of the main clock MCL. The input ports 4 are adapted so that a segment arriving at the port i is placed one word in front of a segment arriving at the port i−1, modulo n. Similarly, the output ports 7 are adapted so that a segment sent to the port i is placed one word in front of a segment sent to the port i−1, modulo n.

Refer now to FIGS. 2 to 6 for a description of one embodiment of a routing stage of the invention.

Figure 2:
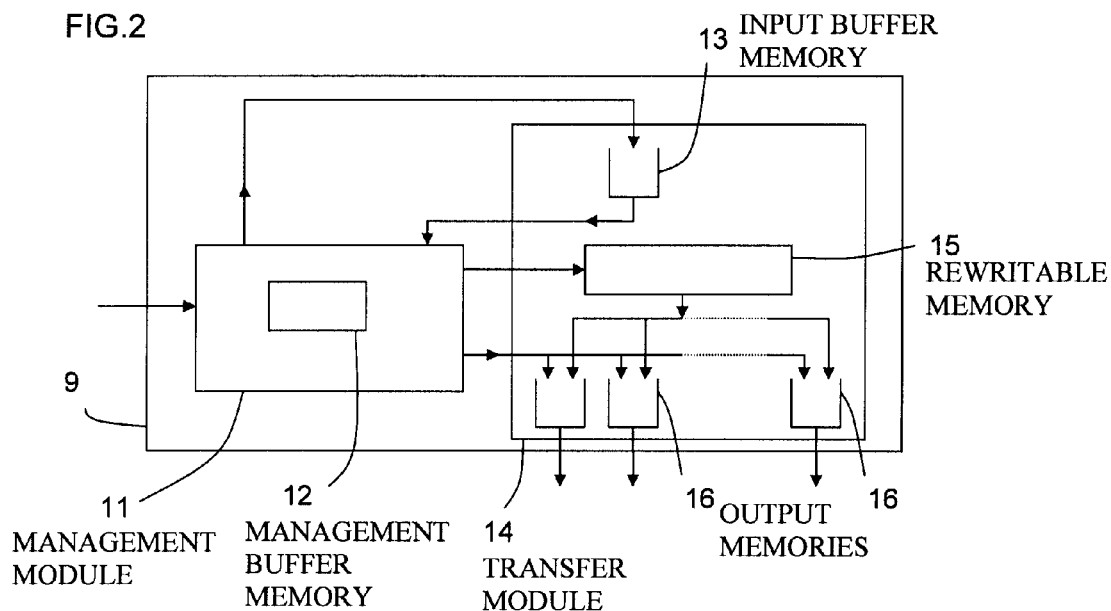
FIG. 2 is a block diagram showing a routing stage of the FIG. 1 device.

The routing stage 9 shown in FIG. 2 is of the L3F type. It includes a management module 11 including a management buffer memory 12 in which the primary routing data contained in the first segment sent by the input sub-stage 3, the storage address FSA(n) in the buffer memory 5 of the first segment of the secondary data associated with the primary data, and (preferably) the total number PL(i) of segments of the associated packet are stored at a selected address i.

Figure 3:
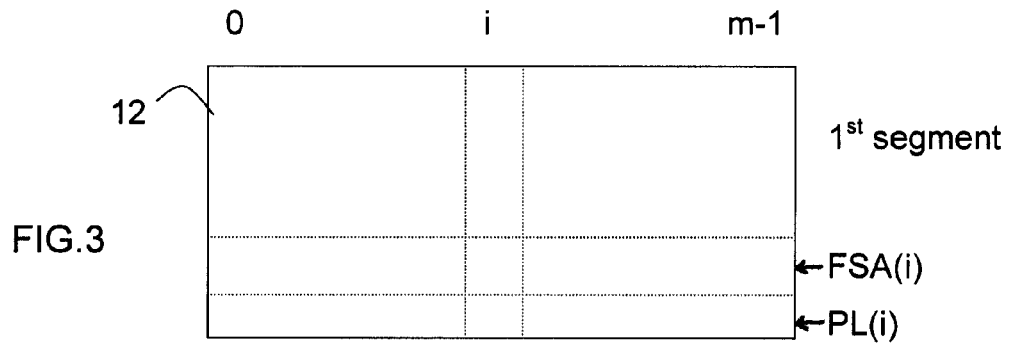
FIG. 3 is a diagram showing one example of the organization of a buffer memory of a management module of the FIG. 2 routing stage.

As shown in FIG. 3, the first segments and the complementary data (FSA(i) and PL(i)) are preferably stored vertically in the management buffer memory 12, which is preferably a circulating memory. Consequently, if the buffer memory 12 has m inputs (also known as columns), a first segment is replaced by a new first segment when m packets to be routed have been received.

The size m of the buffer memory 12 can easily be controlled as a function of the bit rate of the packets incoming into the device 1 and the service bit rate of the device 1 (or the bit rate at which the packets are routed). The service bit rate is preferably higher than the input bit rate so that, even with a small size m of the buffer memory 12, it is guaranteed that no segment will be lost (or replaced, which would lead to the loss of the associated packet).

Figure 4:
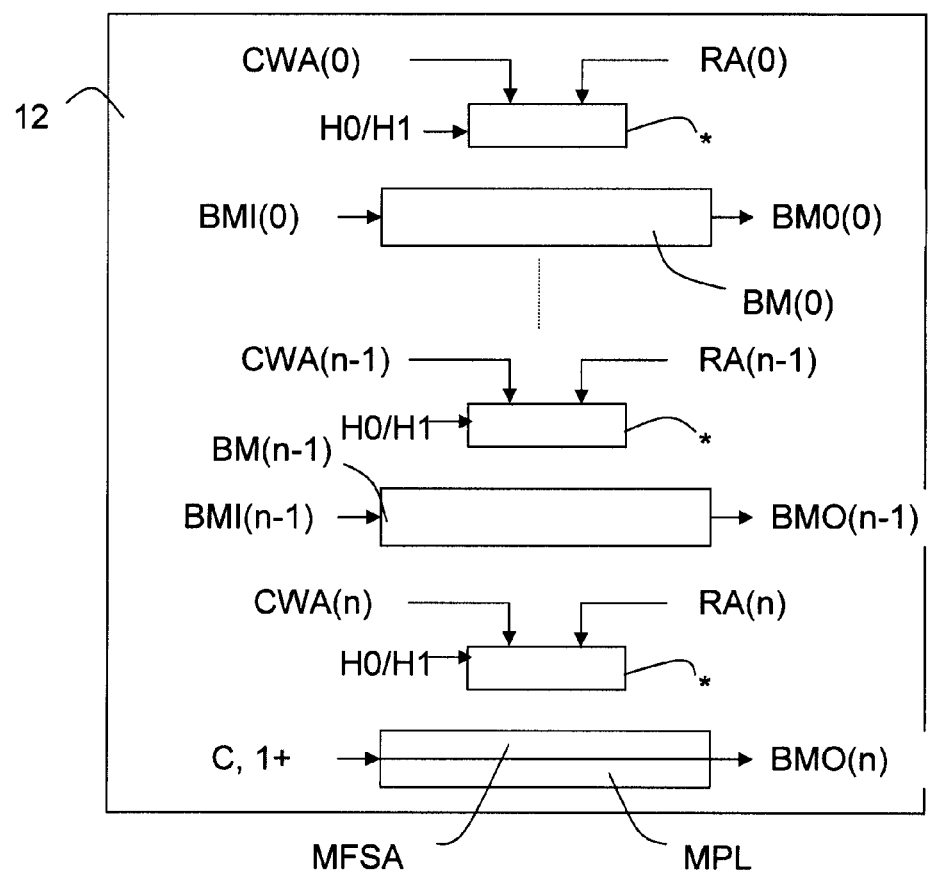
FIG. 4 is a diagram showing one example of the implementation of a buffer memory of a management module of the FIG. 2 routing stage.

As shown diagrammatically in FIG. 4, the management buffer memory 12 preferably includes n identical and independent sub-memories BM(0) to BM(n−1), each sub-memory BM(r) storing a word having the rank r in all the segments. Each word is written into the sub-memories BM(r) via a bus BMI(r) and extracted therefrom via a bus BMO(r).

The main clock MCL synchronizes reading (extraction from) and writing (entry in) of the buffer memory 12. As shown in FIG. 9A, the clock half-period H1 is dedicated to writing and the clock half-period H0 is dedicated to reading. Moreover, as shown in FIG. 4, the sub-memories BM(r) addressed in read mode and in write mode via a multiplexer *.

Figure 5:
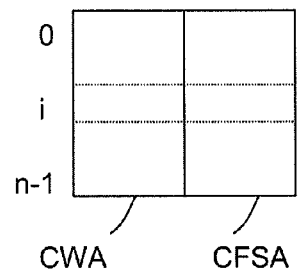
FIG. 5 is a diagram showing one mode of storing (writing) data in the buffer memory of the management module of the FIG. 2 routing stage.

To be more precise, as shown in FIG. 5, for writing, two counters are associated with each sub-memory BM(r). The counter CWA(r) contains the address of the buffer memory 12 in which an incoming word of rank r of a segment is to be stored. The counter CFSA(r) contains the address of the buffer memory 12 in which the first segment of a packet is stored. Because the buffer memory 12 includes n sub-memories BM(r), there are n pairs of counters (CWA, CFSA).

The counters preferably take the form of a circular shift buffer, which shifts the stored data by one step in each period of the clock MCL following a write operation. For example, the row "0" takes the value of the row "n−1", the row "1" takes the value of the row "0", ..., the row "n−1" takes the value of the row "n−2".

Two situations can arise before the shift is effected. The following logic describing the situations is depicted as C, 1+ in FIG. 4. If the first segment of a new packet arrives, then, if i represents the value of CFSA(0):

FSA(i): address of the first segment in the buffer memory 5, given by the value of the main counter MCP(s), where s is the size of the buffer memory 5;

PL(i)=1;

CFSA(0)=CWA(0); and

CWA(n−1)=CWA(0)+1(modulo m).

This latter operation increments the address at which the next segment received is stored, thereby ensuring that the segment that arrived previously is not overwritten. This operation is not effected if the current segment is not the first segment of a packet. Consequently, this segment is overwritten by future segments until a new first segment arrives.

If the segment received is not the first segment of a new packet, then, if i represents the value of CFSA(0):

PL(i)=PL(i)+1(modulo m).

When the last segment of a packet is received, the address (CFSA(0)) of the first segment of the packet in the buffer memory 12 is placed in the queue of an input buffer memory 13, which is preferably of the FIFO type, so that the primary data received is processed as a function of its order of arrival in the routing stage 9. If the FIFO input memory 13 contains data, that data is processed just like the secondary data of the associated packet. The size of the FIFO input memory 13 is preferably equal to the size of the management buffer memory 12.

The FIFO input memory 13 is part of a transfer module 14 of the routing stage 9 coupled to the management module 11 (see below).

All the ports of the input sub-stage 3 and the output sub-stage 6 preferably have the same bit rate as the line interface cards coupled to the device 1. However, as described in the patent document EP 0 440 281, line interface cards can be used that have a bit rate equal to an integer multiple of that of the input port 4 and output port 7. For example, if the bit rate of the ports is equal to 2.4 Gbit/s, four ports can be associated with an OC192c format line interface.

To this end, each line interface can be connected to k successive ports [j, j+1, . . . , j+k−1]. The case where k=1 corresponds to a line interface connected to a single port. In this case, if the first word of a segment is received at the port j+x (subject to the condition $0 \leq x < k$), the two situations described above are modified as follows.

If the first segment of a new packet arrives, then, if i represents the value of CFSA(0+x):
FSA(i): address of this first segment in the buffer memory 5, given by the value of the main counter MCP(s), where s is the size of the buffer memory 5;
PL(i)=1;
CFSA(0+x)=CWA(0+x); and
CWA(n−1)=CWA(0+x)+1(modulo m).

If the segment received is not the first segment of a new packet, then, if i represents the value of CFSA(0+x):
PL(i)=PL(i)+1(modulo m).

In this case, of the k pairs of counters (CWA, CFSA) associated with the line interface, only the first pair is used.

Figure 6:
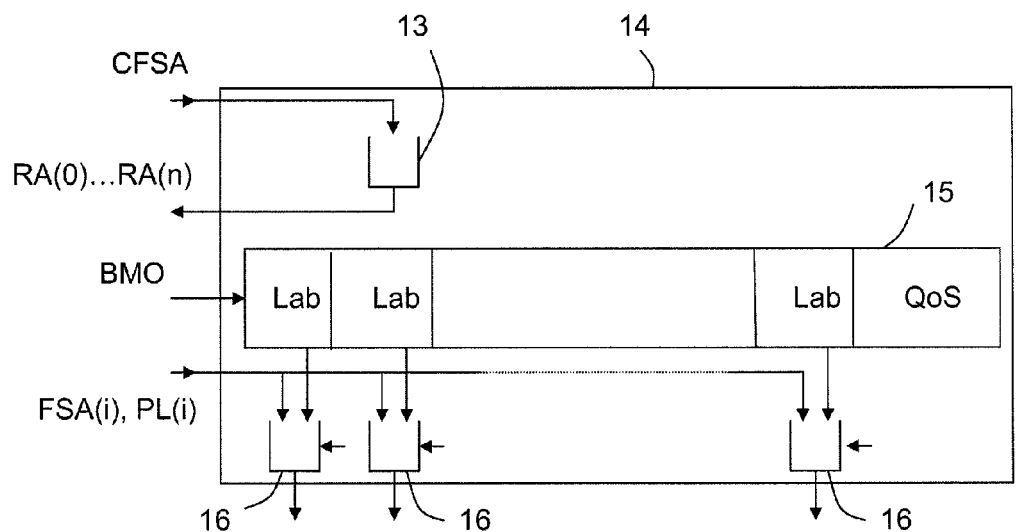
FIG. 6 is a diagram showing one embodiment of a transfer module of the FIG. 3 routing stage.

As indicated above, the buffer memory 12 of the management module 11 is read during the half-period of the clock MCL reserved for it. As shown in FIG. 6, each time that the whole of a packet has been received by the routing stage, the address CFSA of its first segment in the buffer memory 12 of the management module 11 is placed at the end of the queue of the FIFO input memory 13. During each clock half-period dedicated to reading the buffer memory 12, if there is a word at the head of the queue of the FIFO input memory 13, it is extracted by the transfer module 14 and communicated to the management module 11 in order for it to read the single word stored in each sub-memory BM(r) of the buffer memory 12 at the address designated by the word supplied by the transfer module 14. Of course, the address can vary from one sub-memory to another. Thus all the information stored in the addressed column of the buffer memory 12 can be read (extracted) simultaneously.

This information (primary data, storage address FSA(n) and associated total number PL of segments) is then communicated by the management module 11 to the transfer module 14 so that it can determine, in a routing table stored in a rewritable memory 15, tertiary data designating each output port 7 to which secondary data awaiting re-transmission in the buffer memory 5 is to be delivered and new primary routing data ("labels" (LAB)) that corresponds to the primary data received and is to be associated with the secondary data as a function of their respective output ports 7.

As shown in FIG. 6, the routing table can also deliver complementary information, for example information relating to the quality of service (QoS) associated with the received packet to be routed. This complementary information (QoS) can also be delivered and monitored by the traffic control stage 10 so that it is shared by the switching stage 8 and the routing stage 9.

The transfer module 14 of the routing stage 9 also includes at least as many output buffer memories 16 as there are output ports 7 of the output sub-stage 6. These output memories 16 are preferably FIFO memories.

Each FIFO output memory 16 is adapted to receive, firstly, from the rewritable memory 15, the new primary data and the tertiary data addressed to the associated output port 7 and, secondly, from the management module 11, the storage address FSA(n) of the secondary data in the buffer memory 5 and the associated total number PL of segments.

Alternatively, if the routing table also delivers complementary information, such as the quality of service (QoS), each output port 7 can be associated with a group of FIFO output memories 16. Each group then includes a FIFO output memory 16 associated with each quality of service offered.

Figure 8:
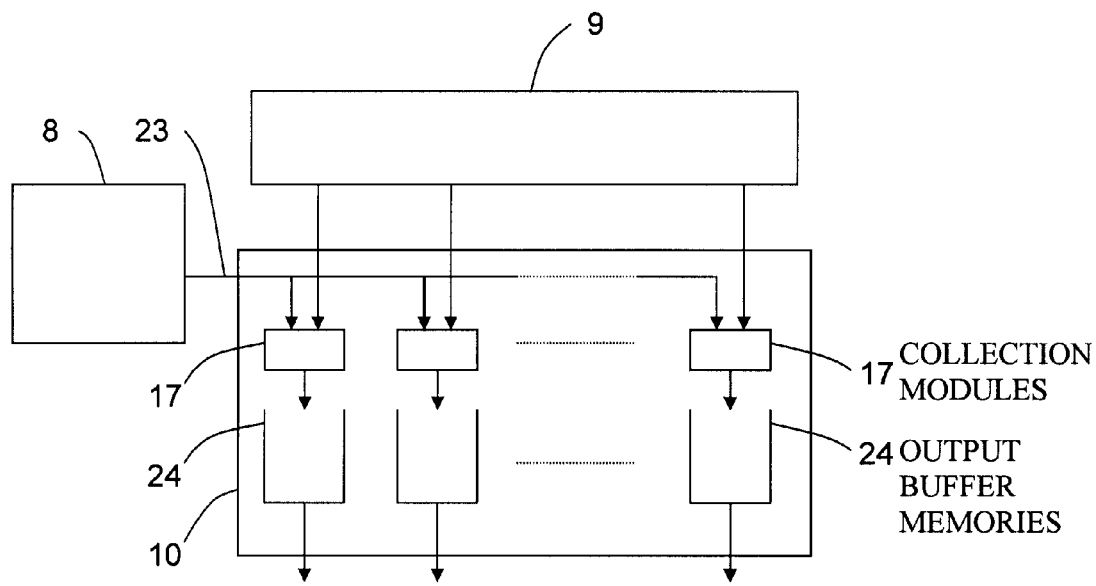
FIG. 8 is a block diagram showing a traffic monitoring stage of the FIG. 1 device.

The FIFO output memories 16 preferably feed collection modules 17 of the traffic monitoring stage 10, which are described later with reference to FIG. 8.

Figure 7:
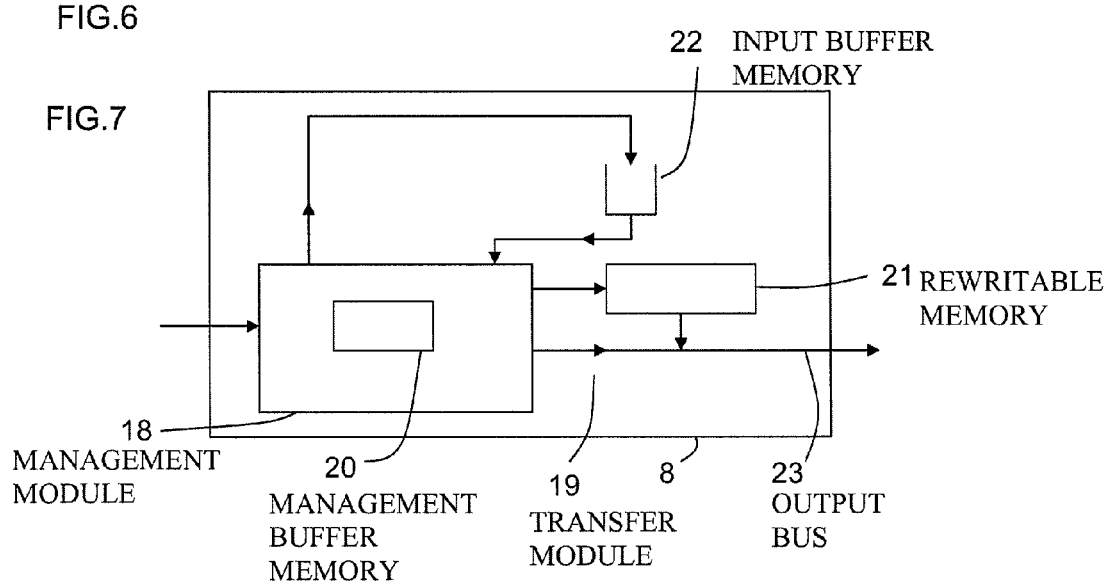
FIG. 7 is a block diagram showing a switching stage of the FIG. 1 device.

Refer now to FIG. 7 for a description of one embodiment of an L2F switching stage.

The switching stage 8 has many similarities with the routing stage 9. It includes a management module 18 substantially identical to the management module 11 of the routing stage 9, both in terms of its components and in terms of its operation, and a transfer module 19 coupled to the management module 18 and in part identical to the transfer module 14 of the routing stage 9.

The management module 18 includes a management buffer memory 20 in which the primary switching data contained in the first segment sent by the input sub-stage 3, the storage address FSA(i) of the secondary data associated with the primary address, and (preferably) the total number PL(i) of segments of the associated packet are stored at a selected address CFSA2(i).

The transfer module 19 includes a rewritable memory 21 which stores a switching table and an input buffer memory 22 which stores the address CFSA2(i) of the buffer memory 20 in which the data supplied by the input sub-stage 3 is stored. The input buffer memory 22 is preferably a FIFO memory so that the primary data received is processed as a function of its order of arrival in the switching stage 8. Unlike the transfer module 14 of the routing stage 9, the transfer module 14 of the switching stage 8 has no FIFO output memories. The latter are in the traffic monitoring stage 10, to be described later, and are replaced by an output bus 23.

In the case of switching, the primary data generally takes the form of a local connection identifier used as a switching table index. Many switching standards operate in accordance with this principle, for example ATM, frame-based ATM, frame relay and MPLS, regardless of the media. In the MPLS case, the local identifier, referred to as a "label", is used to switch the packet locally and the new primary data delivered by the switching table forms a new label used for switching in the next device.

Because the operation of the switching stage 8 is similar to that of the routing stage 9, except for the transfer of data into the FIFO output memories, it is not described in detail. The buffer memory 20 of the management module 18 is read during the half-period of the clock MCL reserved for it. Each time that the whole of a packet has been received by the switching stage 8, the address CFSA2 of its first segment in the buffer memory 20 of the management module 18 is placed at the end of the queue of the FIFO input memory 22. During each clock half-period dedicated to reading the buffer memory 20, if there is a word at the head of the queue of the FIFO input memory 22, it is extracted by the transfer module 19 and communicated to the management module 18 so that it can read the single word stored in each sub-memory BM2(r) of the buffer memory 20 at the address designated by the word supplied by the transfer module 19. Of course, the address can vary from one sub-memory to another. Accordingly, all of the information stored in the addressed column of the buffer memory 20 can be read (extracted) simultaneously.

This information (primary data, storage address FSA(n) and total number PL of associated segments) is then communicated by the management module 18 to the transfer module 19 so that it can determine in the switching table stored in the rewritable memory 21 tertiary data designating each output port 7 to which the secondary data awaiting retransmission in the buffer memory 5 is to be delivered and new primary switching data (labels (LAB)) that corresponds to the received primary data and is to be associated with the secondary data as a function of the respective output ports 7.

The switching table can also deliver complementary information, for example information relating to the quality of service (QoS) associated with the received packet to be routed.

The transfer module 19 of the switching stage 8 also includes an output bus 23 adapted to receive, firstly, from the rewritable memory 21, the new primary data and the tertiary data addressed to the various output ports 7 (and where applicable the complementary information, such as the quality of service) and, secondly, from the management module 18, the storage address FSA(n) of the secondary data in the buffer memory 5 and the associated total number PL of segments.

The output bus 23 preferably feeds the collection modules 17 of the traffic monitoring stage 10, which is described next with reference to FIG. 8.

As indicated above, the traffic monitoring stage 10 includes collection modules 17 fed, firstly, by the bus 23 of the switching stage 8 and, secondly, by the FIFO output memories 16 of the routing stage 9, and output buffer memories 24 fed by the collection modules 17. The output buffer memories 24 are preferably FIFO memories.

There are preferably at least as many collection modules 17 and FIFO output memories 24 as there are output ports 7. Alternatively, if the routing and switching tables deliver complementary information, such as the quality of service (QoS), each output port 7 can be associated with a group of FIFO output memories 24, and thus with a group of collection modules 17. Each group then includes a collection module 17 or a FIFO output memory 24 associated with each quality of service offered.

The traffic monitoring stage 10 monitors the handling of the packets received as a function of their primary data and in particular the associated quality of service, if any.

Because only one packet can be handled in each period of the main clock MCL, it is the traffic monitoring stage 10 that decides which of the recently received packets whose secondary data is temporarily stored in the buffer memory 5 is to be handled first.

When all the packets received have been routed (or switched), there is no priority conflict problem. The packets are routed (or switched) either as a function of their order of arrival or as a function of the associated quality of service, in particular.

On the other hand, if the device 1 receives packets to be routed and packets to be switched in very short time intervals, it must make choices in accordance with a criterion. These choices can be very complicated to manage if the quality of service is involved.

The n FIFO output memories 24 are scanned cyclically. A FIFO memory 24 is read in each period of the main clock MCL, a cycle including n clock periods. During period i (modulo n), if no packet is on the point of being sent to the output port i (7), the associated FIFO memory i (24) is read and delivers its content (address FSA(n), associated number PL of segments and labels), so that in the next clock period the associated secondary data can be sent to the output port i (7) after adding new primary and tertiary data.

The switching and routing data reaching the collection modules 17 is transferred selectively into the corresponding FIFO memories 24 as a function of a criterion managed by the traffic monitoring stage 10. If no switching data reaches the collection module i (17) associated with the FIFO memory i (24) that is to be read during the period i of the main clock MCL, if there is routing data in that collection module i (17), it is preferably transferred into the FIFO memory i (24), in order to be read.

In this example, the selection criterion favors the switching data. However, any other selection criterion can be envisaged, of course. In particular, priority can be assigned to the routing data, or to alternate operation, or to operation in self-adaptive mode, the priorities changing as a function of the traffic received.

The collection modules 17 described above collect routing and switching data so that it can be extracted in accordance with the selection criterion. However, the traffic monitoring stage 10 can instead use the modules 17 to extract the switching or routing data from the output bus 23 of the switching stage 8 or the FIFO output memories 16 of the routing stage 9, as a function of the selection criterion.

The data transport stage 2, switching stage 8, routing stage 9 and traffic monitoring stage 10 are described above by way of illustrative example only and lend themselves to very many variants and adaptations. In particular, they can be implemented in separate, coupled circuits, or in a single circuit, integrated onto an electronic circuit card. Moreover, these stages consist mainly of electronics, but can also include software modules, in particular intended to manage their respective and/or conjoint operation.

The invention also proposes a method of handling data packets. The method can be implemented using the device described hereinabove. Because the main and optional functions and sub-functions provided by the steps of the method are substantially identical to those provided by the various means constituting the device, only the steps using the main functions of the method of the invention are summarized hereinafter. The method consists in:

receiving data packets at input ports 4, extracting primary switching or routing data and secondary data to be handled from the received data packets and associating the data with a selected storage address FSA(n), storing the secondary data extracted at the storage address FSA(n), determining tertiary data designating at least one of the output ports 7 and determining new primary switching or routing data from the received primary data and data stored in a switching table or in a routing table, according to whether the received data is primary switching or routing data, Delivering, to a sending means, the tertiary data, the new primary switching or routing data, and the storage address as a function of a selected criterion, and extracting the secondary data stored at the storage address and sending the extracted secondary data combined with the new primary data to each output port 7 designated by the tertiary data delivered.

When data packets are received, they can first be divided into segments of equal length so that they can be processed in a segmented form enabling them to be handled independently of their length. Of course, in this case the segments are reconstituted before being sent to the output ports 7.

The invention centralizes the principal functions of a router and a switch, which are not inherently linked to a line interface. This applies in particular to buffering, switching, routing, traffic monitoring and quality of service. This considerably reduces the complexity of the handling device architecture and the cost of the line interface cards, and consequently that of the network.

The invention also circumvents constraints relating to the proportion of packets to be routed relative to the packets to be switched. It also becomes possible to envisage extreme situations in which all of the packets are either routed or switched, without creating any bottlenecks.

The invention also enables routing in broadcast mode or in multicast mode, provided that the maximum number of branches of the multipoint broadcast tree is equal to the number of ports of the device.

Furthermore, the invention allows any type of protocol to be used at the line interfaces, and any number of line interfaces, including at OC192c type bit rates and above.

Finally, the device of the invention can also be used as an edge switch-router (ESR), in which case a packet routed by the routing stage can be switched to a label switch path (LSP) and a packet switched by the switching stage and coming from an LSP can be routed to an IP interface, for example.

The invention is not limited to the embodiments of devices and methods described above by way of example only, but encompasses all variants that the person skilled in the art might envisage within the scope of the following claims.

The invention claimed is:

1. A data packet handling device comprising:
    input ports and output ports for respectively receiving and transmitting data packets,
    receiver means which extracts primary switching data or primary routing data, and secondary data from data packets received by said input ports, and which associates the secondary data with a selected storage address,
    a memory which stores said secondary data extracted by said receiver means at said selected storage address without said primary switching data or said primary routing data,
    a switching stage which receives from the receiver means the primary switching data and said selected storage address, determines tertiary data designating at least one of said output ports, and determines new primary switching data from the primary switching data and data stored in a switching table,
    a routing stage which receives from the receiver means the primary routing data and said selected storage address, determines tertiary data designating at least one of said output ports, and determines new primary routing data from the primary routing data and data stored in a routing table,
    monitoring means configured to extract the tertiary data which is determined by the switching stage and the new primary switching data from the switching stage, or extract the tertiary data which is determined by the routing stage and the new primary routing data from the routing stage, and to deliver said extracted tertiary data from the switching stage, said extracted new primary switching data from the switching stage, and the selected storage address to a sending means as a function of a selected criterion, or to deliver said extracted tertiary data from the routing stage, said extracted new primary routing data from the routing stage, and the selected storage address to said sending means as a function of said selected criterion, and
    said sending means which extracts from said memory the secondary data stored at the selected storage address and sends the extracted secondary data combined with said extracted new primary switching data or said extracted new primary routing data to each output port designated by said extracted tertiary data from the switching stage or said extracted tertiary data from the routing stage,
    wherein said switching stage includes an L2F switching stage,
    wherein said L2F switching stage includes i) a management module including a management buffer memory configured to store at a selected management buffer memory address at least the primary switching data and said selected storage address communicated by the receiver means and ii) a transfer module coupled to the management module and including a rewritable memory in which said switching table is stored and an input buffer memory configured to store said selected management buffer memory address as a function of the selected criterion and to communicate said selected management buffer memory address to said management module on command, in which case said management module is configured, on receiving said selected management buffer memory address, to communicate to said transfer module at least some of said stored primary switching data and said selected storage address for said transfer module to determine said new primary switching data and said tertiary data which is determined by the switching stage in said switching table from the received primary switching data and to deliver said new primary switching data and said tertiary data which is determined by the switching stage and said selected storage address on instructions of said monitoring means.

2. A device according to claim 1, wherein said receiver means is configured to divide each data packet received into segments of equal length, so that said secondary data is stored in segmented form, and said sending means is configured to reconstitute said stored, segmented secondary data in order to combine it with said extracted new primary switching data or said extracted new primary routing data.

3. A device according to claim 1, wherein said routing stage includes an L3F routing stage.

4. A device according to claim 1, wherein said monitoring means includes at least a same number of buffer memories as there are said output ports and said buffer memories are configured to receive from the switching stage, the selected storage address, the new primary switching data, and the tertiary data which is determined by the switching stage, or said buffer memories are configured to receive from the routing stage, the selected storage address, the new primary routing data, and the tertiary data which is determined by the routing stage.

5. A device according to claim 1, wherein said monitoring means includes a same number of buffer memory groups as there are said output ports and said buffer memory groups are configured to receive from the switching stage, said selected storage address, the new primary switching data, and the tertiary data which is determined by the switching stage, or said buffer memory groups are configured to receive from the routing stage, said selected storage address, the new primary routing data, and the tertiary data which is determined by the routing stage.

6. A device according to claim 1, wherein the input buffer memory is a FIFO memory.

7. A device according to claim 1, wherein the switching table comprises switching data in accordance with a switching standard selected from a group consisting of ATM, frame-based ATM, frame relay and MPLS protocols.

8. A device according to claim 1, wherein the routing table comprises routing data in accordance with the Internet Protocol.

9. A data packet handling device comprising:
    input ports and output ports for respectively receiving and transmitting data packets,
    receiver means which extracts primary switching data or primary routing data, and secondary data from data packets received by said input ports, and which associates the secondary data with a selected storage address, a memory which stores said secondary data extracted by said receiver means at said selected storage address without said primary switching data or said primary routing data, a switching stage which receives from the receiver means the primary switching data and said selected storage address, determines tertiary data designating at least one of said output ports, and determines new primary switching data from the primary switching data and data stored in a switching table, a routing stage which receives from the receiver means the primary routing data and said selected storage address, determines tertiary data designating at least one of said output ports, and determines new primary routing data from the primary routing data and data stored in a routing table, monitoring means configured to extract the tertiary data which is determined by the switching stage and the new primary switching data from the switching stage, or extract the tertiary data which is determined by the routing stage and the new primary routing data from the routing stage, and to deliver said extracted tertiary data from the switching stage, said extracted new primary switching data from the switching stage, and the selected storage address to a sending means as a function of a selected criterion, or to deliver said extracted tertiary data from the routing stage, said extracted new primary routing data from the routing stage, and the selected storage address to said sending means as a function of said selected criterion, and said sending means which extracts from said memory the secondary data stored at the selected storage address and sends the extracted secondary data combined with said extracted new primary switching data or said extracted new primary routing data to each output port designated by said extracted tertiary data from the switching stage or said extracted tertiary data from the routing stage, wherein said routing stage includes an L3F routing stage, wherein said L3F routing stage includes i) a management module including a management buffer memory configured to store at a selected management buffer memory address at least the primary routing data and said selected storage address communicated by the receiver means and ii) a transfer module coupled to the management module and including a rewritable memory in which said routing table is stored and an input buffer memory configured to store said selected management buffer memory address as a function of the selected criterion and to communicate said selected management buffer memory address to said management module on command, in which case said management module is configured, on receiving said selected management buffer memory address, to communicate at least some of said stored primary routing data and said selected storage address to said transfer module for said transfer module to determine said new primary routing data and said tertiary data which is determined by the routing stage in said routing table from the received primary routing data and to deliver said new primary routing data and said tertiary data which is determined by the routing stage and said selected storage address on instructions of said monitoring means.

10. A device according to claim 9, wherein said transfer module has a same number of output buffer memories as there are said output ports, and said output buffer memories are configured to receive said tertiary data which is determined by the routing stage from the rewritable memory, said new primary routing data from the rewritable memory, and said selected storage address from the management module.

11. A device according to claim 9, wherein said transfer module includes a same number of groups of output buffer memories as there are said output ports and each group is configured to receive said tertiary data which is determined by the routing stage from the rewritable memory, said new primary routing data from the rewritable memory, and said selected storage address from the management module.

12. A device according to claim 11, wherein the output buffer memories of a group are associated with different qualities of service.

13. A device according to claim 12, wherein said monitoring means includes a same number of intermediate modules as there are said output ports, and said intermediate modules are configured to store in a first area the selected storage address, the new primary switching data, and the tertiary data which is determined by the switching stage, and store in a second area the selected storage address, the new primary routing data, and the tertiary data which is determined by the routing stage, so as to deliver to output buffer memories of the monitoring means, on command and as a function of the selected criterion, either said selected storage address, said new primary switching data, and said tertiary data which is determined by the switching stage, or said selected storage address, said new primary routing data, and said tertiary data which is determined by the routing stage.

14. A method of handling data packets, the method comprising:

receiving data packets at input ports, extracting primary switching data or primary routing data, and secondary data from said received data packets, and associating the secondary data with a selected storage address, storing the secondary data extracted at said selected storage address without said primary switching data or said primary routing data, determining tertiary data designating at least one output port, and determining new primary switching data from said primary switching data and data stored in a switching table, or determining new primary routing data from said primary routing data and data stored in a routing table, delivering, to a sending means, the tertiary data, said new primary switching data or said new primary routing data, and said selected storage address as a function of a selected criterion, and extracting the secondary data stored at said selected storage address and sending the extracted secondary data combined with said new primary switching data or said new primary routing data to each output port designated by said delivered tertiary data, wherein said new primary switching data is determined by storing at least said primary switching data and said selected storage address in a management buffer memory, of a management module, at a selected management buffer memory address, storing said selected management buffer memory address as a function of the selected criterion, and communicating said selected management buffer memory address to said management module on command, wherein said management module, on receiving said selected management buffer memory address, communicates to a transfer module at least some of said primary switching data and said selected storage address for said transfer module to determine said new primary switching data and said tertiary data which is determined by a switching stage in said switching table from the received primary switching data, and wherein said transfer module delivers said new primary switching data and said tertiary data which is determined by the switching stage and said selected storage address on instructions of a monitoring means.

15. A method according to claim 14, wherein when said data packets are received they are divided into segments of equal length so that said secondary data is stored in segmented form, and said stored, segmented secondary data is reconstituted in order to combine it with said new primary switching data or said new primary routing data before sending the extracted secondary data.

16. A method according to claim 14, wherein the determination of said tertiary data and the determination of said new primary switching data is performed by L2F switching.

17. A method according to claim 14, wherein the determination of said tertiary data and the determination of said new primary routing data is performed by L3F routing.

18. A method according to claim 14, wherein said new primary switching data or said new primary routing data, and said tertiary data are stored and said selected criterion is then applied, in order to select either said new primary routing data or said new primary switching data for sending the secondary data.

19. The method according to claim 14, wherein said switching stage includes an L2F switching stage.

20. A method of handling data packets, the method comprising:

receiving data packets at input ports, extracting primary switching data or primary routing data, and secondary data from said received data packets, and associating the secondary data with a selected storage address, storing the secondary data extracted at said selected storage address without said primary switching data or said primary routing data, determining tertiary data designating at least one output port, and determining new primary switching data from said primary switching data and data stored in a switching table, or determining new primary routing data from said primary routing data and data stored in a routing table, delivering, to a sending means, the tertiary data, said new primary switching data or said new primary routing data, and said selected storage address as a function of a selected criterion, and extracting the secondary data stored at said selected storage address and sending the extracted secondary data combined with said new primary switching data or said new primary routing data to each output port designated by said delivered tertiary data, wherein said new primary routing data is determined by storing at least said primary routing data and said selected storage address in a management buffer memory, of a management module, at a selected management buffer memory address, storing said selected management buffer memory address as a function of a selected criterion, and communicating said selected management buffer memory address to said management module on command, wherein said management module, on receiving said selected management buffer memory address, communicates to a transfer module at least some of said primary routing data and said selected storage address for said transfer module to determine said new primary routing data and said tertiary data which is determined by a routing stage in said routing table from the received primary routing data, and wherein said transfer module delivers said new primary routing data and said tertiary data which is determined by the routing stage and said selected storage address on instructions of a monitoring means.

21. The method according to claim 20, wherein said routing stage includes an L3F routing stage.

* * * * *